Nov. 13, 1962 E. FISCHER 3,063,092
MOVABLE PLATEN ASSEMBLY FOR MOLDING MACHINES
Filed Jan. 23, 1961 3 Sheets-Sheet 3
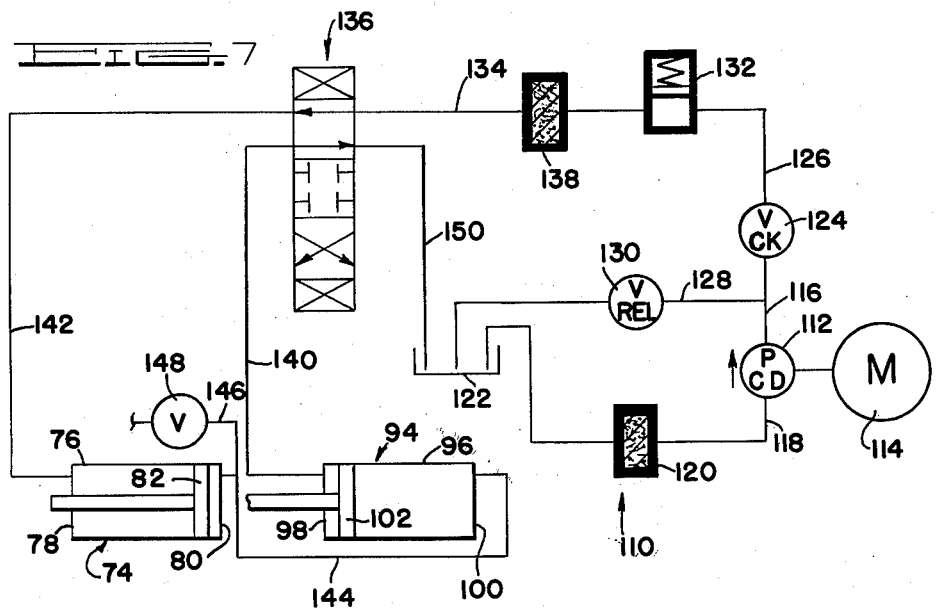
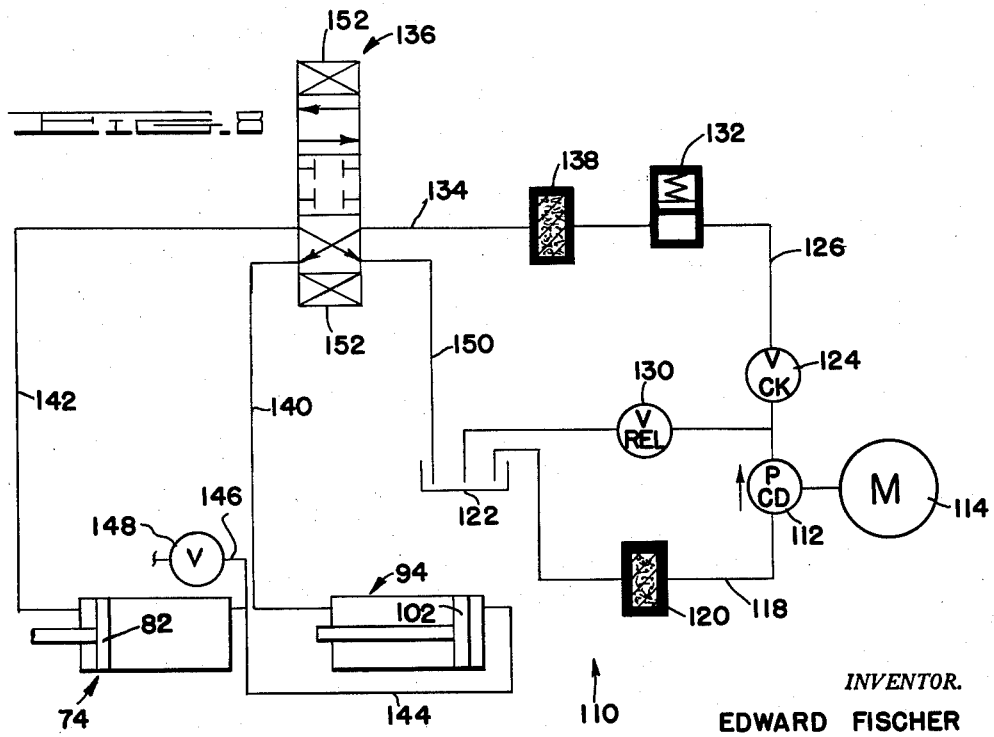
INVENTOR.
EDWARD FISCHER
BY
OLSEN AND STEPHENSON
ATTORNEYS United States Patent Office 3,063,092
Patented Nov. 13, 1962

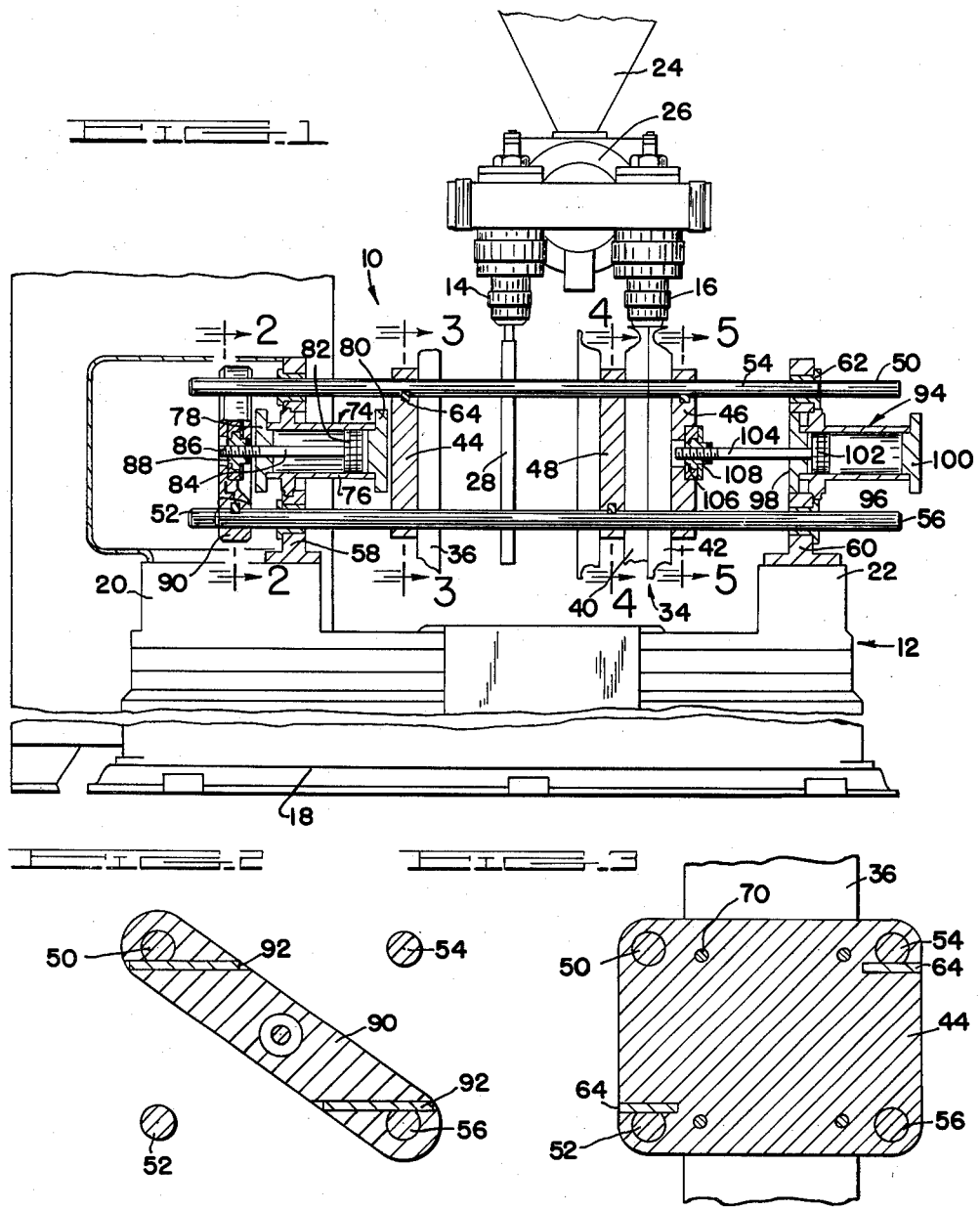

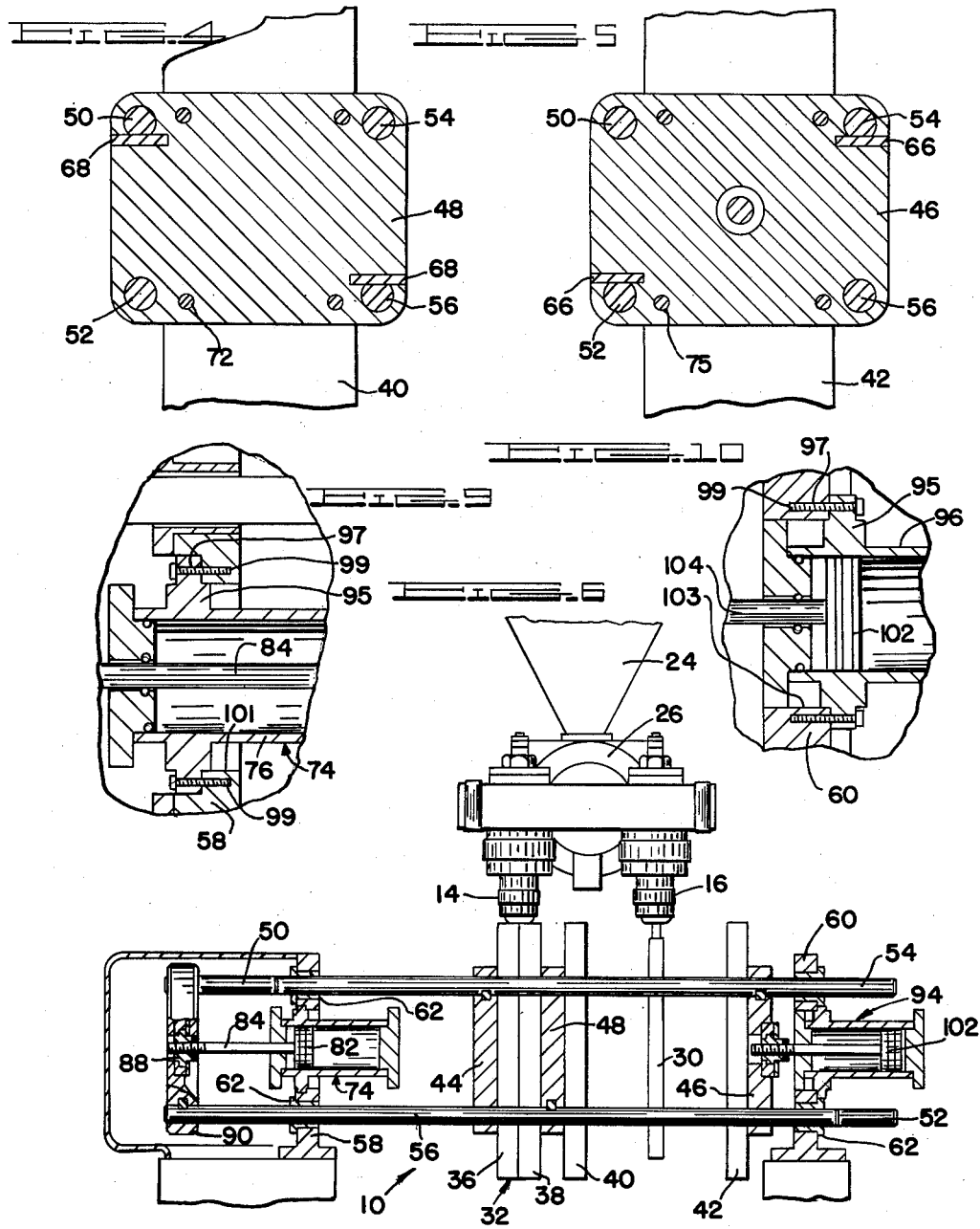

3,063,092
MOVABLE PLATEN ASSEMBLY FOR MOLDING MACHINES
Edward Fischer, Saline, Mich., assignor to Hoover Ball & Bearing Co., Ann Arbor, Mich., a corporation of Michigan
Filed Jan. 23, 1961, Ser. No. 84,306
14 Claims. (Cl. 18—5)

This invention relates generally to molding machines and more particularly to an improved movable platen assembly for molding machines.

In one type of blow molding machine, a pair of fixed die heads or extrusion nozzles are mounted in a side-by-side relation on the machine and heated plastic in a semi-fluid condition is extruded downwardly through first one and then the other of the die heads to form a tubular parison at first the one and then the other die head. A mold, consisting of a pair of horizontally movable mold sections, is provided for each of the die heads and the mold sections for each die head are moved radially inwardly toward the parison at that die head to positions in which the mold cavity formed by the mold sections surrounds the parison. Air under pressure is blown into the parison to expand it outwardly against the inner mold walls where the plastic cools and forms the rigid plastic part which is then removed from the machine after the mold sections have been retracted away from the formed part. The mold sections are mounted on movable platens which are manipulated so that when the mold sections for one mold are in engagement to close the mold and form the mold cavity, the corresponding mold sections for the other mold are moved apart to open the mold for removal of the formed part. It is desirable in a machine of this type, therefore, to provide a movable platen assembly which is simple, economical to construct, and easy to maintain over a prolonged service life. It is an object of this invention, therefore, to provide an improved platen assembly for molding machines which includes these desirable features and which also provides for substantially balanced forces on the opposed mold sections when they are in cavity forming positions to thereby insure a centered position of the mold cavity relative to the parison.

Another object of this invention is to provide a movable platen assembly for molding machines which is fluid operated by fluid actuated cylinder assemblies which are connected so that they operate in unison and provide for the application of balanced closing forces to the mold sections.

A further object of this invention is to provide a hydraulically actuated movable platen assembly for molding machines which is readily actuated by a control valve.

Further objects, features and advantages of this invention will become apparent from a consideration of the following description, the appended claims, and the accompanying drawing in which:

FIGURE 1 is a fragmentary front elevational view of a two-mold blow molding machine equipped with the platen assembly of this invention, with some parts broken away and other parts shown in section for the purpose of clarity, and illustrating the machine in a position in which one of the molds is closed and the other mold is open;

FIGURES 2, 3, 4 and 5 are transverse sectional views looking along the lines 2—2, 3—3, 4—4, and 5—5, respectively, in FIG. 1;

FIGURE 6 is a fragmentary front elevational view of the machine shown in FIG. 1, showing the machine in a moved position from that shown in FIG. 1 so that the one mold is open and the other mold is closed;

FIGURE 7 is a diagrammatic view of the hydraulic control circuit for the platen assembly of this invention, showing the components of the circuit in one position corresponding to one position of the control valve in the circuit;

FIGURE 8 is a diagrammatic view of the hydraulic control circuit illustrated in FIG. 7, showing the circuit components in moved positions relative to the positions shown in FIG. 7 and corresponding to a moved position of the control valve in the circuit; and FIGURES 9 and 10 are enlarged fragmentary views of the hydraulic cylinder assemblies in the platen assembly of this invention, illustrating the mounting of the cylinder assemblies.

With reference to the drawing, the platen assembly of this invention, indicated generally at 10, is illustrated in FIG. 1 in assembled relation with a blow molding machine 12 of a type having a pair of side-by-side vertical die heads or extrusion nozzles 14 and 16. The machine 12 also includes a base or main frame 18 having upstanding side portions 20 and 22. The usual hopper 24 into which bulk plastic material to be molded is loaded, is also provided along with an extruder 26 which communicates with the hopper 24 and functions to both heat the plastic material and convey it to the nozzles 14 and 16. A flow control valve (not shown) operates to direct the heated plastic in a semi-fluid condition from the extruder 26 alternately to the die heads 14 and 16. Each of the heads 14 and 16 includes a die (not shown) having an annular opening, and the machine 12 operates automatically in a well known manner to continuously extrude plastic from the extruder 26 downwardly through first one head 14 and then the other head 16 so as to first form a downwardly extending tubular parison 28 of a predetermined length at the head 14, and then a tubular parison 30 (FIG. 6) of a predetermined length at the head 16.

Two molds 32 and 34, corresponding to the die heads 14 and 16, are provided, and each of the molds consists of a pair of horizontally movable sections which are movable into mating engagement to surround a parison 28 or 30, respectively, to define a mold cavity against which the parison is blown. The mold 32 consists of a pair of mold sections 36 and 38 and the mold 34 consists of a pair of mold sections 40 and 42. A pair of end platens 44 and 46 and a center platen 48 are mounted on the machine 10 for supporting the molds 32 and 34. The platens 44, 46 and 48 are mounted on four tie bars 50, 52, 54 and 56 which extend horizontally of the machine 10 and are slidably supported in upright mounting plates 58 and 60 secured to and extended upwardly from the upstanding frame portions 20 and 22, respectively. Each of the mounting plates 58 and 60 carries four tubular bushings 62 in which the tie bars 50, 52, 54 and 56 are slidably supported for axial reciprocal movement.

The end platen 44 is slidably supported on diagonally opposite tie bars 50 and 56 and is secured, as by keys 64 (FIG. 3) to the diagonally opposite tie bars 52 and 54. The other end platen 46 is similarly slidably supported on the diagonally opposite tie bars 50 and 56 and is secured, as by keys 66 (FIG. 5) to the diagonally opposite tie bars 52 and 54. The center platen 48 (FIG. 4) is slidably supported on the diagonally opposite tie bars 52 and 54 and is secured, as by keys 68, to the diagonally opposite tie bars 50 and 56.

The mold section 36 (FIGS. 1, 3 and 6) is mounted on the end platen 44 in any suitable manner and is illustrated as being secured to the end platen 44 by bolts 70. The mold section 38 which cooperates with the mold section 36 to form the mold 32 is similarly mounted on the side of the center platen 48 which faces the end platen 44. On the opposite side of the center platen 48, the mold section 40 for the mold 34 is secured to the center platen 48, such as by bolts 72 (FIG. 4). The other mold section 42, for the mold 34, is mounted on the end platen 46 in any suitable manner and is shown (FIG. 5) as secured to the end platen 46 by bolts 75.

A hydraulic cylinder assembly, indicated generally at 74 (FIGS. 1 and 6), includes a cylinder 76 secured to a central portion of the support plate 58 and provided with end plates 78 and 80, a piston 82 and a piston rod 84 projected axially from one side of the piston 82 through the end plate 78. A threaded end portion 86 of the piston rod 84 is adjustably attached, by means of a nut assembly 88, to a central portion of a bridge 90 (FIG. 2) which extends about and is secured by keys 92 to the diagonally opposite pair of tie bars 50 and 56 which are secured by the keys 68 (FIG. 4) to the center platen 48. Thus, on actuation of the cylinder assembly 74 to reciprocate the piston 82 therefor, the tie bars 50 and 56 are axially reciprocated in their bushings 62 to also move the center platen 48 back and forth between its positions illustrated in FIGS. 1 and 6.

A second hydraulic cylinder assembly, indicated generally at 94, includes a cylinder 96 secured to a central portion of the mounting plate 60 and having end plates 98 and 100, and a piston 102 provided with a piston rod 104 extended from one side of the piston 102 axially through the end plate 98. A threaded end portion 106 of the piston rod 104 is adjustably secured by a nut assembly 108 to a central portion of the end platen 46. Thus, on actuation of the cylinder assembly 94 to reciprocate the piston 102, the end platens 44 and 46 and the tie bars 52 and 54 to which they are secured are movable back and forth between the positions shown in FIGS. 1 and 6.

The cylinder assemblies 74 and 94 are identical, thereby facilitating manufacture and installation of the platen assembly 10 because the assemblies 74 and 94 can be interchanged. Each of the cylinders 76 and 96 is formed with an integral or attached flange 95 (FIGS. 9 and 10) which extends radially outwardly from the cylinder intermediate its ends. Each flange 95 is formed with a reduced thickness outer edge portion 97 adapted to receive a plurality of bolts 99. The cylinder 76 is mounted on the support plate 58 by extending it through a central opening 101 in the plate 58 to a position in which the flange 95 telescopes into the opening 101 and one side of the outer edge portion 97 thereof engages the support plate 58 around the opening 101. The cylinder 96 is mounted on the support plate 60 by extending it into a central opening 103 in the plate 60 to a position in which the flange 95 telescopes into the opening 103 and the opposite side of the outer edge portion 97 thereof engages the support plate 60 around the opening 103. The bolts 99 are extended through the support plates 58 and 60 to attach the cylinders.

The cylinder assemblies 74 and 94 are concurrently actuated so that the pistons 82 and 102 therefor are alternately moved between the positions shown in FIG. 1, in which the mold 34 is closed and the mold 32 is open and the positions shown in FIG. 6 in which the mold 34 is opened and the mold 32 is closed. For actuating the cylinders 74 and 94 to provide for this concurrent movement, a hydraulic control assembly, indicated generally at 110 in FIGS. 7 and 8 is provided. The assembly 110 includes a constant output pump 112 driven by a motor 114 and connected to an outlet line 116 and an inlet line 118. As used herein, the term "line" is synonymous with the words "conduit" and "pipe" and describes any hollow passage capable of conducting fluid. The inlet line communicates through a filter 120 with a tank or reservoir 122. The outlet line 116 is connected through a check valve 124 to a line 126 and the check valve 124 functions to permit flow only in a direction from the line 116 to the line 126. A line 128, which carries a pressure relief valve 130, extends between the line 116 and the tank 122. The line 126 is connected to the inlet side of an accumulator 132 which is connected on its outlet side by a line 134 to a control valve 136, and a filter 138 is interposed in the line 134.

A line 140 connects the control valve 136 and the end plate 98 in the cylinder assembly 94. A line 142 connects the control valve 136 with the end plate 78 in the cylinder assembly 74. It is significant that the lines 140 and 142 are connected to their respective cylinders 76 and 96 on corresponding sides of the pistons 82 and 102 therein, in the illustrated embodiment on the rod sides of the pistons, as contrasted to the head sides of the pistons. The end plates 80 and 100 in the cylinder assemblies 74 and 94 are connected by a fluid line 144, and a second line 146, provided with a shut off valve 148, is connected to the line 144 to permit initial charging of the line 144 and the communicating portions of the cylinders 76 and 96 with fluid, namely, the portions of the cylinders on the head sides of the pistons.

As shown in FIGS. 7 and 8, the line 144 connects to the closed or plate ends, as contrasted to the rod ends, of the cylinders 76 and 96, which are of identical size, so that when the piston 102 is moved from its position shown in FIG. 7 toward the closed end of its cylinder 96 to the position shown in FIG. 8, the fluid forced out of the cylinder 96 by the piston 102 flows through the line 144 into the closed end of the cylinder 76 so as to move the piston 82 toward the rod end of its cylinder 76 a distance equal to the distance moved by the piston 102. Thus, when the cylinder assembly 94 is actuated it acts as a master cylinder and the cylinder assembly 74 functions as the slave cylinder. Conversely, when the cylinder assembly 74 is actuated when it is in its position shown in FIG. 8, so that the piston 82 is moved toward the closed end of the cylinder 76, fluid forced out of the cylinder 76 by the piston 82 flows through the line 144 and into the closed end of the cylinder 96 so as to drive the piston 102 therein toward the rod end of its cylinder 96 a distance equal to the distance traveled by the piston 82.

The control valve 136 is movable between three positions, one of which is illustrated in FIG. 7, in which the valve 136 operates to connect the lines 134 and 142 so that fluid under pressure from the line 134 is supplied through the line 142 to the cylinder assembly 74. In this position the control valve 136 also connects the line 140 from the cylinder assembly 94 with a return line 150 which extends between the control valve 136 and the reservoir 122. A second position of the control valve 136 is illustrated in FIG. 8 and in this position the control valve 136 connects the fluid supply line 134 with the line 140 to the cylinder assembly 94 and connects the line 142 from the cylinder assembly 74 to the return line 150. In a third position, which is utilized when the machine 12 is idle, intermediate the positions illustrated in FIGS. 7 and 8, the control valve 136 merely blocks the lines 134 and 150. The control valve 136 is moved between its positions by actuation of a pair of solenoids, indicated diagrammatically at 152, which are responsive to operation of one or more other parts of the machine 12 to coordinate the platen movement with the formation of the parisons 28 and 30.

In the operation of the machine 12 with the platen assembly 10 of this invention, assume that the machine parts are in the positions illustrated in FIG. 1 in which the mold 34 is closed and the mold 32 is open. The control valve 136 is in the position illustrated in FIG. 7 so that fluid under pressure from the pump 112 is acting on the piston 82 to maintain the tie bars 50 and 56 and the center platen 48 in the position shown in FIG. 1. The pressure of the fluid in the cylinder 76 is thus acting on the piston 82 to create a force which is applied through the piston rod 84, the bridge 90 and the tie bars 50 and 56 to the center platen 48 to hold the mold section 40 in its closed position. The mold sections 40 and 42 are positioned so that they engage prior to engagement of the piston 82 with the cylinder end plate 80 and prior to engagement of the piston 102 with the end plate 98. Consequently, when the mold sections 40 and 42 are fully engaged, the fluid forces in the cylinder 76 on opposite sides of the piston 82 are equal. Since the fluid pressures in the cylinders 76 and 96 on the head sides of the pistons 82 and 102 are equal, by virtue of their connection by the line 144, the total fluid force applied to the piston 102 is equal to the total fluid force applied to the piston 82. Consequently, since this force on the piston 102 is transmitted through the piston rod 104 to the end platen 46 which carries the mold section 42, the total closing forces applied to the mold sections 40 and 42 are substantially balanced. This balancing of forces eliminates any tendency of the mold sections 40 and 42 to creep to either side of centered positions relative to the parison 30.

When the mold 34 has been fully closed, the parison 30 is blown into conformity with the wall of the mold cavity defined by the mold sections 40 and 42 concurrently with the extrusion of the parison 28 at the die head 14. The control valve 136 is maintained in the position shown in FIG. 7 for a time period sufficient to permit blowing of the parison 30 into conformity with the mold cavity and to permit some cooling of the resulting formed plastic part. During this time period, the pump 112 pumps fluid into the accumulator 132 so as to charge the accumulator to a capacity determined by the setting of the pressure relief valve 130. Consequently, when one or both of the solenoids 152 are actuated to move the control valve 136 to its position illustrated in FIG. 8, the accumulator 132 functions to immediately force fluid through the line 134 and the control valve 136 into the line 140 so as to rapidly move the piston 102 from its position shown in FIGS. 1 and 7 toward its position shown in FIGS. 6 and 8.

The capacity of the accumulator 132 is such that the volume of fluid forced from the accumulator 132 into the line 140 is sufficient to rapidly move the piston 102 about two-thirds or three-fourths of the distance corresponding to its full stroke. As a result, the mold sections 40 and 42 are rapidly moved away from each other and the mold sections 36 and 38 are rapidly moved toward each other. Fluid pumped from the pump 112 into the line 140 then moves the piston 102 to its final position illustrated in FIGS. 6 and 8 in which the mold sections 36 and 38 are fully engaged and the pistons 82 and 102 are spaced from their adjacent cylinder end walls. The output of the pump 112 is such that this final portion of the travel of the mold sections 36 and 38 is at a slower rate than their initial travel so that they are moved into engagement at a relatively slow speed to avoid damage to the mold sections. During movement of the piston 102 from its position shown in FIG. 7 to its position shown in FIG. 8, it drives the piston 82 to provide for a balancing of the forces on the mold sections 36 and 38 which maintain them in the closed position illustrated in FIG. 6. Fluid forced out of the cylinder assembly 74 travels through the line 142 and the control valve 136 to the return line 150 which conveys this fluid to the reservoir 122.

While the mold 32 is closed, and a parison 28 is being blown into conformity with the mold cavity defined by the mold, the pump 112 charges the accumulator 132 and the parison 30 is extruded from the die head 16. When one or both of the solenoids 152 are actuated to return the control valve 136 to its FIG. 7 position, fluid from the accumulator 132 is directed through line 142 into cylinder 76 so that the cylinder assemblies 74 and 94 act to move the platens 44, 46 and 48 so that the mold sections 36 and 38 are rapidly moved apart and the mold sections 40 and 42 are rapidly moved toward their closed positions shown in FIG. 1. Fluid from pump 112 then flows into cylinder assembly 74 at a rate such that the mold sections 40 annd 42 are moved together at a slower rate of speed. While the mold 34 is closed, a parison 30 is being blown into conformity with the mold cavity defined by the mold, the pump 112 charges the accumulator 132 and the parison 28 is extruded from the die head 14. The above described sequence is then repeated continuously for so long as the machine 12 is in operation.

From the above description it is seen that this invention provides a platen assembly 10 which is readily operated so as to provide for alternate closing of the molds 32 and 34 at predetermined positions relative to the parisons 28 and 30. The cylinder assemblies 74 and 94 are identical and have corresponding ends of the cylinders 76 and 96, namely, the closed or head ends in the illustrated embodiment of the invention, connected by the line 144. The portions of the cylinders 76 and 96 which communicate with the line 144 form with the line 144 a closed circuit which insures concurrent and identical movement of the pistons 82 and 102. As a result, the end platens 44 and 46 are moved the same distance the center platen 48 is moved each time the platens are actuated and they approach a parison at the same rate of speed and from the same distances. A centering of the molds 32 and 34 relative to the parisons 28 and 30 is thus assured, without any tendency of one mold section to engage the parison before another mold section. The forces on the closed mold sections are also balanced as previously explained. A liquid, such as oil, is preferred in the cylinder assemblies 74 and 94 because of its incompressible nature.

The machine 12 has been described with reference to the extrusion of a single parison at each head 14 and 16 and a single mold cavity in each of the molds 32 and 34. It is to be understood however that a plurality of parisons can be simultaneously extruded at a head 14 or 16 and multiple cavities corresponding in number to the number of parisons can be provided in each mold, and that in such case the operation of the platen assembly 10 is the same as described herein.

It will be understood that the movable platen assembly for molding machines which is herein disclosed and described is presented for purposes of explanation and illustration and is not intended to indicate limits of the invention, the scope of which is defined by the following claims.

What is claimed is:

1. In a molding machine having a plurality of molds each of which includes a plurality of mold sections movable toward each other into engaged positions to close the mold and movable away from each other to open the mold, a center platen and a pair of end platens for supporting said mold sections, means connecting said end platens for maintaining them in a predetermined spaced relation, a first fluid actuated cylinder assembly connected to one of said end platens and operable to reciprocate said end platens so that first one and then the other end platen is moved toward said center platen, and a second fluid actuated cylinder assembly connected to said center platen and operable to reciprocate said center platen so that it is movable toward the one of said end platens being moved toward said center platen for moving some of said mold sections toward each other and others of said mold sections away from each other.

2. In a molding machine having a pair of side-by-side molds each of which is comprised of a plurality of mold sections movable toward each other into engaged positions to close the mold and movable away from each other to spaced-apart positions to open the mold, a plurality of substantially parallel tie bars slidably mounted in said machine, a pair of end platens secured in a predetermined spaced relation to at least one of said tie bars, a center platen secured to another one of said tie bars, a first fluid actuated cylinder assembly connected to one of said end platens for reciprocating said end platens so that first one and then the other end platen is moved toward said center platen, a second fluid actuated cylinder assembly connected to said other one of said tie bars for reciprocating said center platen between said end platens, said mold sections being mounted on said platens so that when said center platen and one of said end platens are moved toward each other into predetermined relative positions one of said molds is closed and the other mold is opened and when said center platen and the other one of said end platens are moved toward each other said other mold is closed and said one mold is opened, and means for concurrently supplying fluid to said cylinder assemblies so that said platens are moved in unison to alternately open and close said molds.

3. In a blow molding machine having a pair of side-by-side die heads through which plastic in a semi-fluid state is extruded in a downward direction, a pair of molds corresponding to and arranged below said die heads, each of said molds including a pair of mold sections movable horizontally toward each other into engagement to close said mold and movable horizontally away from each other to open the mold, platens supporting the mold sections for each mold and mounted for relative horizontal movement, and a pair of fluid actuated cylinder assemblies connected to said platens for moving the platens so that when each mold is closed one of said assemblies applies a closing force in one direction to one of the mold sections for that mold and the other assembly applies a closing force in the opposite direction to the other mold section for that mold.

4. In a blow molding machine having a pair of side-by-side die heads through which plastic in a semi-fluid state is extruded in a downward direction, a pair of molds corresponding to and arranged below said die heads, each of said molds including a pair of mold sections movable horizontally toward each other into engagement to close said mold and movable horizontally away from each other to open the mold, platens supporting the mold sections for each mold and mounted for relative horizontal movement, a pair of fluid actuated cylinder assemblis connected to said platens for moving the platens so that when each mold is closed one of said assemblies applies a closing force in one direction to one of the mold sections and the other assembly applies a closing force in the opposite direction to the other mold section, and means interconnecting said cylinder assemblies so as to provide for a balancing of said forces.

5. In a blow molding machine having a pair of side-by-side die heads through which plastic in a semi-fluid state is extruded in a downwardly direction, a pair of molds corresponding to and arranged below said die heads, each of said molds including a pair of mold sections movable horizontally toward each other into engagement to close said mold and movable horizontally away from each other to open the mold, platens supporting the mold sections for each mold and mounted for relative horizontally movement, a pair of fluid actuated cylinder assemblies each of which includes a cylinder having a piston mounted therein and provided with a piston rod projecting from one side thereof, said piston rod being connected to said platens for moving the platens so that when each mold is closed one of said assemblies applies a closing force in one direction to one of the mold sections and the other assembly applies a closing force in the opposite direction to the other mold section, and means including a fluid conduit connecting said cylinders on the sides of said pistons opposite said rod sides thereof for providing for a balancing of said forces.

6. In a blow molding machine which includes a main frame, an extrusion die for forming a downwardly extending parison of blowable plastic material, and a pair of mold sections movable substantially horizontally toward each other into engaged positions defining a mold cavity which substantially surrounds said parison, a plurality of substantially horizontal tie bars slidably mounted on said main frame, means securing one of said mold sections to some of said tie bars, means securing the other one of said mold sections to other ones of said tie bars, and a pair of fluid actuated cylinder assemblies mounted on said frame and operatively associated with said mold sections and the tie bars secured thereto so that one of said assemblies is operable to move one of said mold sections and the tie bars secured thereto in one direction and the other assembly is operable to move the other mold section and the tie bars secured thereto in an opposite direction.

7. In a blow molding machine which includes a main frame, an extrusion die for forming a downwardly extending parison of blowable plastic material, and a pair of mold sections movable substantially horizontally toward each other into engaged positions defining a mold cavity which substantially surrounds said parison, a plurality of substantially horizontal tie bars slidably mounted on said main frame, means securing one of said mold sections to some of said tie bars, means securing the other one of said mold sections to other ones of said tie bars, a pair of fluid actuated cylinder assemblies mounted on said frame, one of said cylinder assemblies being operatively associated with one of said mold sections and the tie bars secured thereto for moving said one mold section toward and away from the other mold section, the other one of said cylinder assemblies being operatively associated with the other one of mold sections and the tie bars secured thereto for moving said other mold section toward and away from said one mold section, and means providing for operation of said cylinder assemblies to move said mold sections alternately into and out of engaged mold cavity defining positions.

8. In a moulding machine having a pair of molds each of which is comprised of a pair of mold sections which engage to define a mold cavity, a pair of end platens each of which supports one of said mold sections, a center platen disposed between said end platens and having a pair of said mold sections mounted on opposite sides thereof each of which is engageable with a mold section on an end platen to define a mold cavity, means mounting said platens for relative movement toward and away from each other to positions in which the mold sections thereon alternately define said mold cavities, a pair of fluid actuated cylinder assemblies, means connecting one of said assemblies to said end platens, means connecting the other one of said assemblies to said center platen, and means for operating said assemblies so that they alternately move the center platen and one end platen toward each other to positions in which the mold sections thereon define one mold cavity and move the center platen and the other end platen toward each other to positions in which the mold sections thereon define the other mold cavity.

9. The structure according to claim 8 in which said means for operating said cylinder assemblies includes a control valve, first conduit means connecting said control valve to one of said cylinder assemblies, second conduit means connecting said control valve to the other cylinder assembly, and third conduit means connecting said cylinder assemblies so that when fluid is supplied to either of said assemblies it drives the other assembly to provide for operation of said assemblies in unison.

10. The structure according to claim 8 in which said means for operating said cylinder assemblies includes a pump, an accumulator connected to the output side of said pump, a control valve connected to the output side of said accumulator, first conduit means connecting said control valve to one of said cylinder assemblies, second conduit means connecting said control valve to the other cylinder assembly, and third conduit means connecting said cylinder assemblies so that when fluid is supplied to either of said assemblies it drives the other assembly to provide for operation of said assemblies in unison.

11. In a molding machine having a plurality of mold supporting platens including a pair of end platens and a center platen disposed between said end platens, means mounting said end platens in fixed relative positions and for reciprocal movement, means mounting said center platen for reciprocal movement between said end platens, a pair of fluid actuated cylinder assemblies, means connecting one of said assemblies to said end platens, means connecting the other one of said assemblies to said center platen, and means for operating said assemblies so that they alternately move the center platen and one end platen toward each other and move the center platen and the other end platen toward each other.

12. In a moulding machine having a pair of molds each of which is comprised of a pair of mold sections which engage to define a mold cavity, a pair of end platens each of which supports one of said mold sections, a center platen disposed between said end platens and having a pair of said mold sections mounted on opposite sides thereof each of which is engageable with a mold section on an end platen to define a mold cavity, means mounting said platens for relative movement toward and away from each other to alternately define said mold cavities and so that in one position said center platen is midway between said end platens, a pair of substantially identical hydraulically actuated cylinder assemblies each of which has a cylinder with a piston therein and a piston rod, means connecting one of said piston rods to said end platens, means connecting the other one of said piston rods to said center platen, a closed hydraulic circuit connecting corresponding portions of said cylinders so that a movement of one piston causes an equal and corresponding movement of the other piston, and means for operating said assemblies so that they alternately move the center platen and one end platen toward each other to positions in which the mold sections thereon define one mold cavity and move the center platen and the other end platen toward each other to positions in which the mold sections thereon define the other mold cavity.

13. In a molding machine having a pair of side-by-side molds each of which is comprised of a plurality of mold sections movable toward each other into engaged positions to close the mold and movable away from each other to spaced-apart positions to open the mold, a plurality of substantially parallel tie bars slidably mounted in said machine, a pair of end platens secured in a predetermined spaced relation to at least one of said tie bars, a center platen secured to another one of said tie bars, a first fluid actuated cylinder assembly connected to one of said end platens for reciprocating said end platens so that first one and then the other end platen is moved toward said center platen, and a second fluid actuated cylinder assembly connected to said other one of said tie bars for reciprocating said center platen between said end platens, said mold sections being mounted on said platens so that when said center platen and one of said end platens are moved toward each other into predetermined relative positions one of said molds is closed and the other mold is opened and when said center platen and the other one of said end platens are moved toward each other said other mold is closed and said one mold is opened.

14. In a molding machine having a main frame and a pair of molds each of which is comprised of a pair of mold sections which engage to define a mold cavity, a pair of end platens each of which supports one of said mold sections, a center platen disposed between said end platens and having a pair of said mold sections mounted on opposite sides thereof each of which is engageable with a mold section on an end platen to define a mold cavity, means mounting said platens on said main frame for relative movement toward and away from each other to positions in which the mold sections thereon alternately define said mold cavities, a pair of substantially identical fluid actuated cylinder assemblies each of which has a radial flange formed thereon intermediate the ends thereof, means securing said flanges to spaced portions of said main frame, means connecting one of said assemblies to said end platens, means connecting the other one of said assemblies to said center platen, and means for operating said assemblies so that they alternately move the center platen and one end platen toward each other to positions in which the mold sections thereon define one mold cavity and move the center platen and the other end platen toward each other to positions in which the mold sections thereon define the other mold cavity.

References Cited in the file of this patent

FOREIGN PATENTS

| | | |
|---|---|---|
| 570,281 | Italy | Dec. 5, 1957 |
| 789,816 | Great Britain | Jan. 29, 1958 |
| 1,197,394 | France | Nov. 30, 1959 |
| 1,183,933 | France | June 14, 1961 |